UNITED STATES PATENT OFFICE.

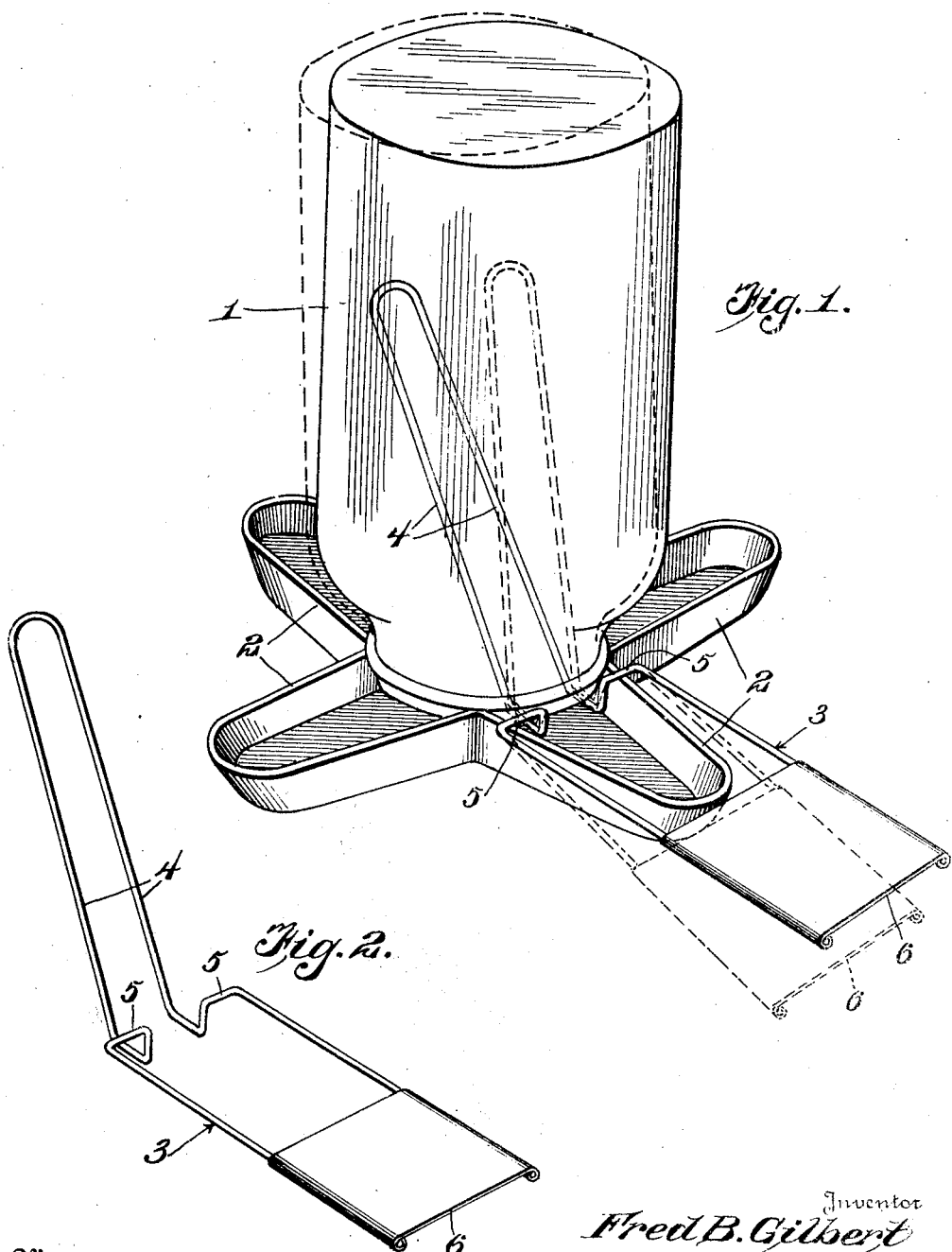

FRED B. GILBERT, OF MODESTO, CALIFORNIA.

FEEDING DEVICE.

1,343,817.                Specification of Letters Patent.    Patented June 15, 1920.

Application filed October 10, 1919. Serial No. 329,649.

*To all whom it may concern:*

Be it known that I, FRED B. GILBERT, a citizen of Canada, residing at Modesto, in the county of Stanislaus and State of California, have invented new and useful Improvements in Feeding Devices, of which the following is a specification.

This invention relates to means for agitating the material in feeding fountains for poultry and animals.

The device is more particularly designed for use for agitating materials such as clabbered milk, thick patented milk of various kinds and other semi-solid feeds. It has been found all such feeds tend to clog up the feeding opening of the fountain unless means are provided to agitate such feeds.

By my invention I provide an agitator adapted to be placed in the fountain and provided with a part projecting from the fountain over the feed trough and carrying a platform upon which the fowl or animal must stand in order to reach the feed in the trough. In this way the agitator is moved every time the fowl or animal attempts to feed.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the device in use in a fountain.

Fig. 2 is a view of the device itself.

In these views 1 indicates the top part of the fountain and 2 indicates the feed trough thereof, the top part resting in said trough and the two parts being free of each other so that the two parts may be separated whenever desired. In this type of fountain when the trough is full the feed outlet from the upper part will be covered and as no air can enter the upper part the flow of material therefrom will be stopped, but as soon as the material in the trough reaches the level below said outlet then air will enter said upper part and the material will flow therefrom into the trough until the outlet is again covered.

The agitator device shown at 3 is preferably made of a single piece of wire bent into loop form. The looped part of this wire provides the agitator 4 which is adapted to be placed within the feed reservoir of the feeder. At the bottom of the agitator the two parts of the wire are bent to provide short horizontal portions and then the two parts of the wire are bent upwardly for a slight distance and then outwardly to provide the shoulders 5 and finally the ends of the wires are carried forwardly in parallel to each other and support the platform 6. This platform may be made of tin or other material with its edges rolled about the ends of the wires.

The agitator loop is placed within the reservoir with the platform projecting out over the feeding trough. To get to the material within the trough the fowl or animal must first step upon the platform so that its weight will lower said platform and thus move the agitator loop to stir the material within the reservoir and at the same time allow air to enter at the lower end of the reservoir so as to close the flow of liquid to the trough.

It is thought from the foregoing description that the advantages and novel features of my invention will be readily apparent.

I desire it to be understod that I may make changes in the construction and in the combination and arrangement of the several parts, provided that such charges fall within the scope of the appended claims.

What I claim is:—

1. In combination with a fountain and its trough, an agitator comprising an upwardly extending part entering the fountain and an outwardly extending part having shoulders thereon engaging the trough and a platform carried by said outwardly extending part.

2. In combination with a feeding fountain and its trough, an agitator comprising an agitator loop entering the fountain and having its lower end bent forwardly and upwardly to engage the trough, forwardly projecting arms connected with said upwardly extending portions and a platform connected with said arms.

In testimony whereof I affix my signature.

FRED B. GILBERT.